United States Patent [19]

Buckley et al.

[11] 4,311,382

[45] Jan. 19, 1982

[54] UNIVERSALLY ADJUSTABLE RANGING TARGET AND RETRO-REFLECTOR HOUSING BRACKET

[75] Inventors: Galen L. Buckley, Irvine; Harold W. Martin, Newport Beach, both of Calif.

[73] Assignee: Pyramid Optical, Inc., Irvine, Calif.

[21] Appl. No.: 117,859

[22] Filed: Feb. 4, 1980

[51] Int. Cl.³ .................. G01C 3/08; G02B 17/02; G02B 5/122

[52] U.S. Cl. .................................. 356/5; 33/293; 248/480; 350/97; 350/100; 350/102; 356/152; 356/4

[58] Field of Search .................. 248/479, 480; 33/277–280, 293; 356/4, 5, 152; 350/100, 102, 109, 97

[56] References Cited

PUBLICATIONS

Wild DI 10 Distomat (Brochure), Wild Heerbrugg, Ltd., Ch-9435 Heerbrugg Switzerland, 7–1974.

*Primary Examiner*—S. C. Buczinski
*Attorney, Agent, or Firm*—Fischer, Tachner & Strauss

[57] ABSTRACT

A combined sighting target and bracket adapted for receiving a reflector housing for use with electronic distance measuring instruments in surveying and other civil engineering applications. The unique structure permits adjustment of three parameters that render the present invention generally compatible for use in conjunction with virtually any kind of electronic distance measuring instrument. One such adjustment, namely, vertical displacement between a reflector housing and the sighting target, permits duplication of any offset distance that exists between a telescope and ranging optics of the remotely located measuring instrument. The other adjustment features include elevation and azimuth angle variations that permit orientation of the reflecting device to be virtually normal with respect to the incoming and reflected laser, infrared, or other such energy commonly used by such electronic distance measuring instruments. The unique structure of the present invention permits such vertical and angular adjustments without incurring any substantial error contributions that would otherwise reduce the accuracy of the measurement process.

10 Claims, 14 Drawing Figures

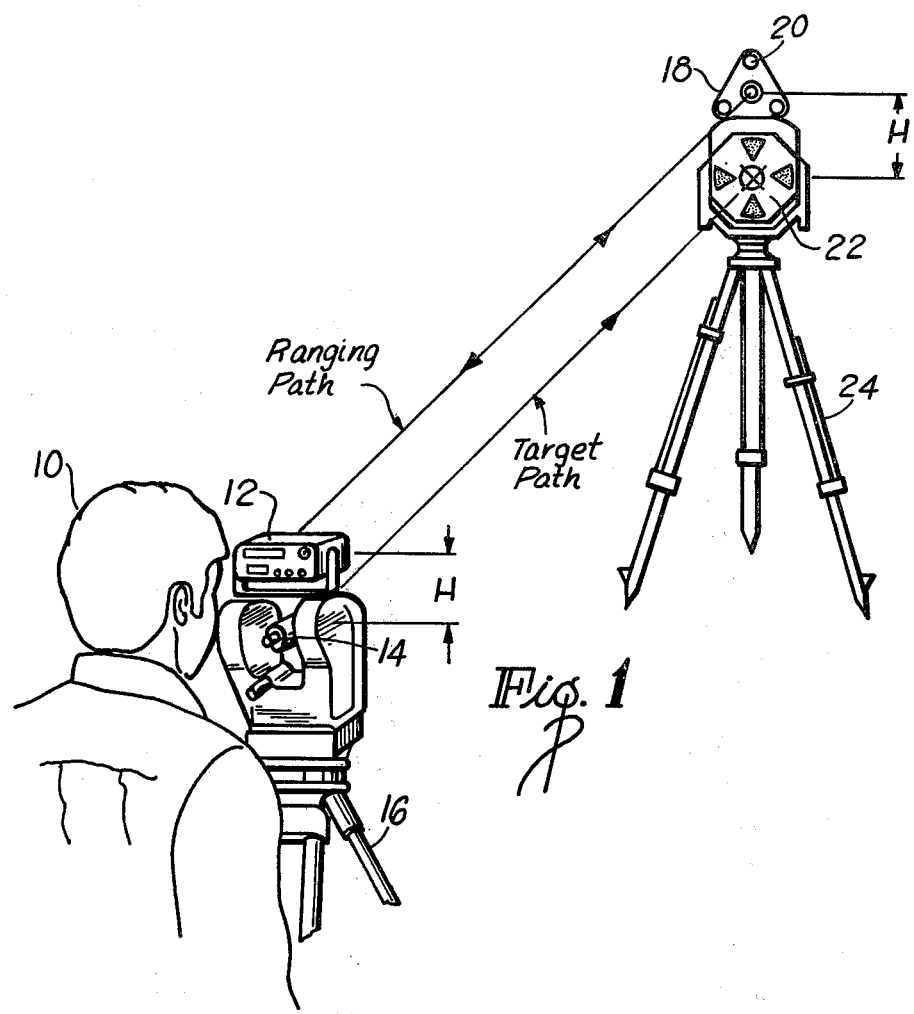
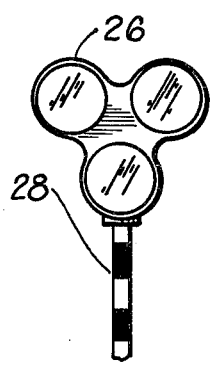
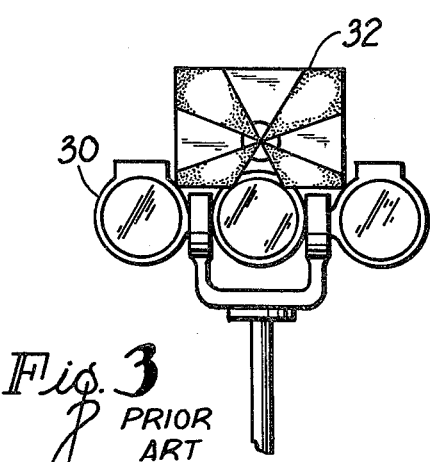

UNIVERSALLY ADJUSTABLE RANGING TARGET AND RETRO-REFLECTOR HOUSING BRACKET

BACKGROUND OF THE INVENTION

This invention relates generally to distance measuring apparatus, and more specifically, to a combined target and prism housing assembly for use in conjunction with distance measuring instruments that employ infrared or laser ranging systems.

The last decade or so has seen the rapid development of microprocessors and infrared and laser optical systems with the resulting development of various electronic distance measuring systems for use in civil engineering applications including surveying. Typically, such electronic distance measuring systems are used to provide range and angular information with respect to remotely located reflecting devices placed at ranges up to 10 or more kilometers from the measuring instrument. Well-known manufacturers of such laser or infrared electronic distance measuring instruments include Hewlett-Packard, the Lietz Company, and A.G.A. Corporation. Usually such electronic distance measuring instruments consist of two main components, namely, the electronic ranging system that utilizes a transmitter/receiver of either infrared or laser energy that is transmitted to a remotely and previously placed reflector assembly, and a sighting telescope that is used to accurately point the ranging system transmitter at the distantly located reflector. Consequently, the remotely located reflectors which utilize retro-reflector devices such as prisms or other such reflecting optics that reflect incident energy on a path that is colinear with that incident energy, are used with a targeting device that permits the surveyor or other user of the equipment to accurately align the ranging electronics and the target by sighting through the telescope to align cross hairs with the remotely positioned target center point.

Even though retro-reflector devices or prisms are designed to return incident infrared or laser energy over a broad range of incoming angles with respect to the face of the reflector, the sensitivity of the receiver portion of the electronic distance measuring instruments usually requires that the reflector be adjusted to be substantially normal to the incoming energy. Consequently, the remotely located target prism combination should be adjustable in azimuth and elevation to permit the user to adjust the reflector face until it is substantially normal to the incoming energy to maximize the level of reflected infrared or laser energy available to the receiver.

The indicated developments in optics and electronics, render the aforementioned electronic distance measuring devices accurate to within a few centimeters or less. Therefore, it is desirable that adjustment of the reflector relative to the targets used for sighting of the telescope, produce no significant error that would be substantially equivalent to or greater than the intrinsic accuracy of the optics and electronics. Otherwise, one of the principal advantages of such new and costly instruments would be substantially defeated. Accordingly, it is important that the distance between the center point of the reflector, or reflector combination, and the sighting target remotely located from the measuring instrument, be, within a very small tolerance, equivalent to the distance between the longitudinal axis of the telescope and the ranging axis over which infrared or laser energy is transmitted and received by the measuring instrument. In addition, it is important that any adjustment of the reflectors to obtain the normalizing relationship referred to above, not incur any additional error between the target point and the reflection point at the remotely located reflection device. To preserve the accuracy noted above, manufacturers of electronic distance measuring instruments also make available various prior art combined reflector and target devices with a substantially fixed offset distance between the target and reflector and a means of adjusting the target in azimuth and elevation. These prior art devices are designed for compatibility with that particular instrument with which it is intended for use and without introducing any substantial additional errors.

Unfortunately, each such prior art target and reflecting device is thus limited for use with one type of reflector such as only a unitary round retro-reflector prism, or only a lateral retro-prism and is usually limited to the above-indicated offset distance between the target and reflecting objects with which the electronic distance measuring instruments is designed to operate. As a result, users of such systems are constrained to use only a specific manufacturer's reflector and target device in conjunction with that manufacturer' electronic distance measuring instrument. This constraint can at times be highly disadvantageous. For example, this disadvantage becomes difficult when one surveying team uses electronic distance measuring systems manufactured by different companies, each employing non-standard offsets or when the differences in instrument sensitivities or in ranges to be measured require different numbers of prisms to reflect sufficient energy back to the devices receiver.

In addition to the above-noted disadvantage, many prior art reflector-target combination devices are not designed to provide adjustment in elevation and azimuth without incurring substantial error in range or angle in comparison to the accuracy capabilities of the measurement instruments with which they are used.

SUMMARY OF THE INVENTION

The present invention overcomes the aforementioned disadvantages of prior art devices by providing an adjustable target and retro-reflector housing assembly that is universally adaptable for use in combination with any well known electronic distance measuring instruments. Accordingly, the present invention provides a combination of a sighting target and bracket for receiving a reflector housing, that permits vertical adjustment therebetween to match any offset distance that exists between the telescope and ranging optics of the instrument with which the invention is used. In addition, the present invention provides a target which is adjustable in both elevation and azimuth with respect to the electronic instrument to provide a reflector face that is substantially normal to the incident laser or infrared energy, but without resulting in any additional error that would otherwise defeat the greater accuracy now attainable as a result of new developments in electronic distance measuring instruments. These unique advantages of the present invention are provided by a combination of three components referred to herein respectively, as adjusting bracket, tilting member, and yoke member, respectively. The adjusting bracket is designed to be compatible with virtually any kind of reflection device commonly in use. For example, the adjusting bracket of the present invention includes a platform configuration that renders it compatible with lateral retro-prisms and also includes a threaded receptical that is adapted to receive prism mounts or housings for either single or triple round prism combinations commonly in use. In addition, the tilting member and adjusting bracket are rotatable in elevation relative to the yoke member without altering the position of the target center point relative to the electronic distance measuring instrument. The yoke member, in addition to forming part of the target pattern for sighting through the telescope, provides means for mounting the invention on a suitable support structure such as a tripod.

OBJECTS

It is therefore a primary object of the present invention to provide a target reflector combination device for use in conjunction with electronic distance measuring instruments and which is adjustable in offset, aximuth and elevation without injecting any substantial inaccuracies into the measurement process.

It is an additional object of the present invention to provide a simple, low cost universally adaptable target reflector device that overcomes or substantially reduces the disadvantages of prior art devices.

It is still an additional object of the present invention to provide a relatively low cost and simple target and reflector combination for use with electronic distance measuring instruments which is compatible with a variety of commonly used reflecting devices and housings including lateral retro-prisms, and round retro-prisms of both unitary and plural configurations.

BRIEF DESCRIPTION OF THE DRAWINGS

The aforementioned advantages and objects of the present invention, as well as additional objects and advantages, will be more fully understood from the following detailed description of a preferred embodiment of the invention taken in conjunction with the accompanying drawings in which:

FIG. 1 is a three-dimensional drawing illustrating a typical range measurement configuration including a prior art target and reflector housing bracket;

FIGS. 2 and 3 are drawings of typical prior art prism and target devices;

DETAILED DESCRIPTION OF A PREFERRED EMBODIMENT

Figure 4:
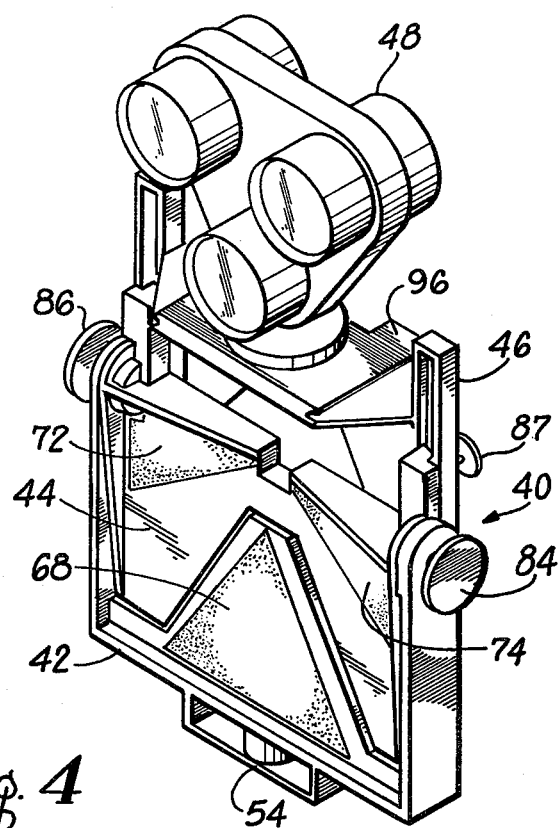
FIGS. 4 and 5 are three-dimensional drawings of the present invention illustrating, respectively, two different adjustment configurations and two different retro-reflector devices attached thereto.

Referring now to the drawings, and more specifically to FIG. 1, a typical measurement configuration of the type in which the present invention may be utilized is illustrated therein. As shown in FIG. 1, a user 10, who may be a surveyor or civil engineer, is shown utilizing a typical electronic distance measuring instrument comprising an electronic ranging device 12, and a telescope assembly 14, both mounted on a tripod 16. Also shown at a distant location relative to the electronic distance measuring instrument, is a combined target and prism assembly consisting of a prism array 18, including prisms 20, and a target device 22 both mounted on a tripod 24. As further shown in FIG. 1 there are two paths, namely, a ranging path and a target path which are relevant to the measurement process. Typically, the user 10 sights through telescope 14 along the target path to be sure that the ranging device 12 separated a distance H from the telescope, is sighted along the precise path to cause the infrared or other such energy transmission to impinge on the prism assembly 18 for maximum relfected energy therefrom which may be received by the instrument 12 for automatic determination of the precise range being measured.

It is to be noted that in order to insure the accuracy of the measurement and the return of maximum reflected energy from the prism assembly 18, the distance H between the measuring instrument 12 and the telescope 14 at the user's location, must be matched by an equal distance H between the prism assembly 18 and the center of the target device 22. In addition, in order to again maximize the return energy along the ranging path, the combined prism assembly and target must be adjustable in elevation so that when the two tripods 16 and 24 cannot be located on the same level, where for example either tripod is located in a valley or on a hill relative to the other, the ranging energy along the ranging path shown in FIG. 1, is still incident on the reflecting prism assembly 18 at an angle of substantially 90° with respect to the plane of the prisms. In this regard it is to be noted that the combined prism assembly and target device 18 and 22 respectively of FIG. 1 is a prior art unit that does provide the elevation adjustment or tilting referred to above, but fails to provide any means for varying the height H between the prism center and target center. In addition, this prior art combination is not readily useable with any other prism combination other than assembly 18 as shown in FIG. 1. It will be seen hereinafter that the present invention, unlike the prior art, does provide means for varying the height H between the center of a prism assembly and the center of a target assembly and, in addition, provides means for mounting a variety of prism assembly configurations and is therefore not disadvantageously limited to the particular combination shown in FIG. 1 or such other prior art configurations of prisms and target assemblies as shown and discussed hereinafter in FIGS. 2 and 3.

The particular prior art configuration of FIG. 2 comprises a triangularly configured tri-prism assembly 26 and a target pole or stick 28. The assembly of FIG. 3 comprises a linearly arranged tri-prism configuration 30 upon which is mounted a rectangular target plate 32. It will be observed that the prior art configuration of FIG. 2 is also not readily adjustable in distance H, is not suitable for use with other prism configurations, and in addition, in this particular example, is not variable in elevation angle. The prior art configuration of FIG. 3, while being variable in elevation angle, still suffers the other disadvantages referred to above, namely, the lack of adjustability in distance H and the failure to provide means for adapting the target to other prism configurations.

The manner in which the noted disadvantages of prior art target and assembly combinations are overcome in the present invention will be better understood hereinafter as a result of the detailed description of the invention as disclosed in FIGS. 4-14.

Figure 5:
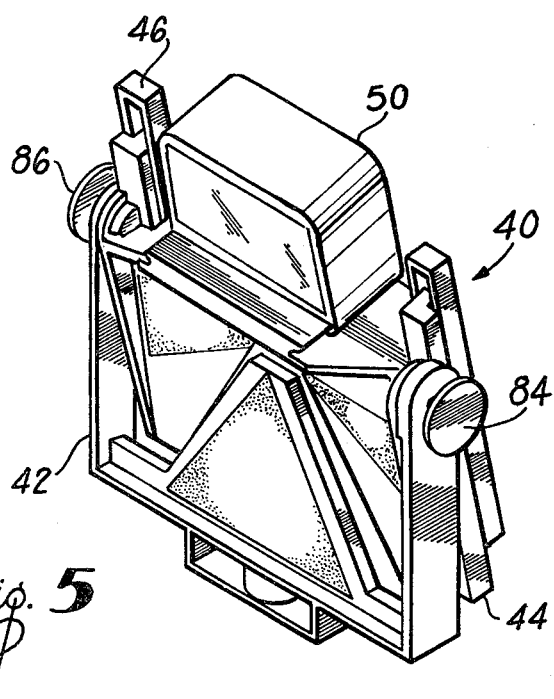

FIGS. 4 and 5 provide three dimensional views of the present invention shown in two different configurations and with two different types of prism or other such retro-reflector assemblies connected thereto. More specifically, in FIG. 4 it will be seen that the present invention 40 comprises a yoke member 42, a tilting member 44, and an adjusting bracket 46. A triple prism assembly 48 in a triangular array is shown connected to the invention in FIG. 4 and a single rectangular retro-reflector assembly 50 is shown connected to the invention in FIG. 5. In addition, the adjustability of distance H and elevation angle is illustrated by the respective views of FIGS. 4 and 5. In FIG. 4 the distance H between the center of prism assembly 48 and the center point of the target is greater than the corresponding distance of FIG. 5. In addition, in FIG. 4, the plane of the reflection surface provided by the prism assembly 48 is substantially normal to ground level and in FIG. 5 the corresponding plane is tilted through an elevation angle that would correspond to that required if the present invention were used on a tripod mounted substantially above the elevation level of the distantly located electronic ranging device.

Figure 6:
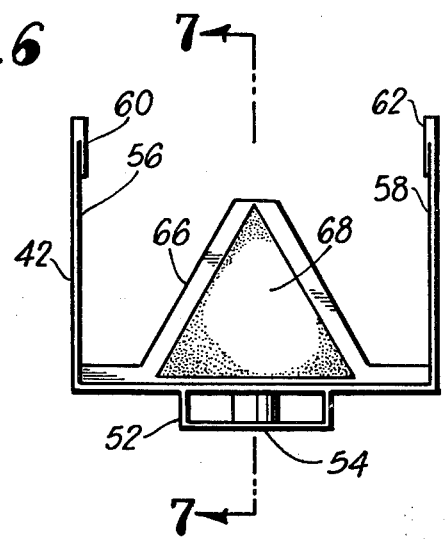
FIGS. 6 and 7 are detailed front and sectional drawings of the yoke member of the present invention with the latter providing a sectional view taken along lines 7—7 of the former.
Figure 7:
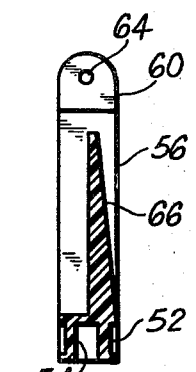

As shown in FIGS. 6 and 7, yoke member 42 comprises a tripod mounting bracket 52 at the bottom edge thereof, which bracket includes aperture 54 which may be threaded to provide means for mounting the present invention onto a suitable tripod. Yoke member 42 also includes a pair of vertical side members 56 and 58 each of which includes generally circular end portions 60 and 62 at the top ends thereof, respectively.

Each such end portion includes an aperture such as aperture 64 as shown in FIG. 7, the purpose of which will be more fully understood hereinafter.

Yoke member 42 also includes a substantially triangular portion 66 located centrally of vertical side members 56 and 58 and upon which is painted or otherwise displayed a triangle 68 of clearly distinguishable color which constitutes one portion of a target array, the other two portions thereof being contained on tilting member 44.

Figure 8:
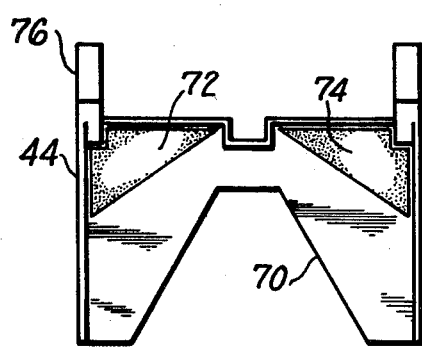
FIGS. 8-11 are detailed front, side, rear and sectional drawings of the tilting member of the present invention, with FIG. 11 providing a sectional view taken along lines 11—11 of FIG. 10.
Figure 10:
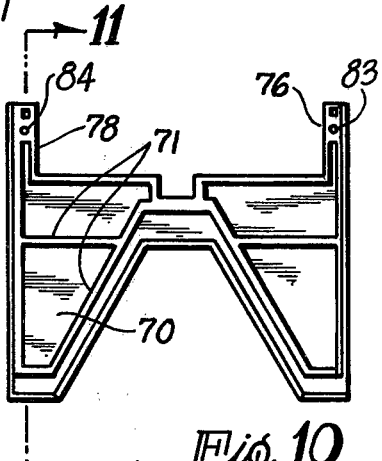

Tilting member 44 includes a planar portion 70 seen in full view in FIGS. 8 and 10. The bottom portion of planar portion 70 is shaped to conform to the outline of substantially triangular portion 66 of yoke member 42 as seen in FIG. 6. Triangles, 72 and 74, are drawn or otherwise displayed at the top of planar portion 70, as shown in FIG. 8, in the same manner as is triangle 68 on yoke member 42 as discussed above. The three triangles, 68, 72, and 74, in combination, define a target point at the intersection of their respective apices which point is used by the surveyor as a targeting point to be sighted through his telescope as previously described in conjunction with FIG. 1.

Figure 9:
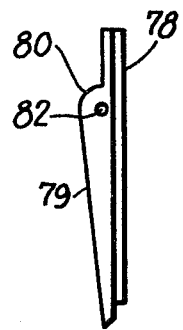

Integral to planar member 70 of tilting member 44 are side portions 76 and 78, respectively, along the edges thereof. As shown in FIG. 9, each such side portion includes a tapered rib-like member 79, which in the embodiment illustrated in FIG. 9, is a substantially triangular member with a circular portion 80 adapted to substantially match one of the corresponding circular portions 60 and 62 of yoke member 42. Each such circular portion also includes an aperture, such as aperture 82 seen in FIG. 9, to axially align with the corresponding aperture such as aperture 64 in yoke member 42 as shown in FIG. 7. It is by means of these coaxially aligned apertures and threaded screw knobs 84 and 86, seen best in FIGS. 4 and 5, the threaded screw portions thereof being inserted in the aforementioned apertures, that the yoke member 42 and tilting member 44 are rotatably secured to one another whereby tilting member 44 may be rotated around the axis through the aforementioned apertures to provide the elevation angle adjustment previously discussed.

Figure 11:
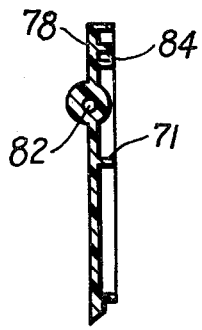

As shown additionally in FIGS. 10 and 11, the rear surface of tilting member 44 also includes an integral rib-like frame 71 which is utilized in the preferred embodiment to add structural strength and rigidity. Side portions 76 and 78 each includes an additional aperture 83 and 84, respectively, which in the preferred embodiment shown in the accompanying figures are drilled normal to the plane of planar member 70 as viewed from the rear in FIG. 10. It will be seen hereinafter that the purpose of apertures 83 and 84 is to provide means for adjustably securing the adjusting bracket 46 of the present invention to the tilting member 44 by additional screw thread knobs such as that screw thread knob 87 shown in FIG. 4.

Figure 12:
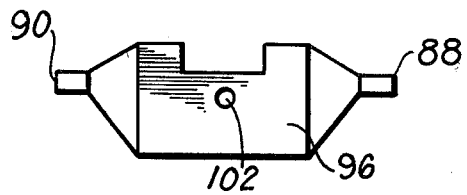
FIGS. 12-14 are detailed top, front and side views of the adjusting bracket of the present invention.
Figure 13:
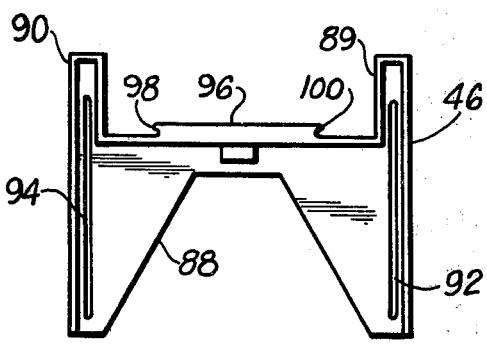
Figure 14:
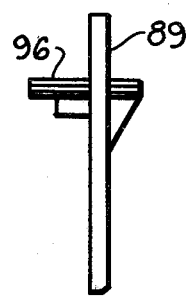

Referring now to FIGS. 12-14 it will be seen that adjusting bracket 46 comprises a planar member 88 which is similar in shape to planar member 70 of tilting member 44. Planar member 88 also includes integral side members 89 and 90, each such side member including an elongated slot 92 and 94, respectively, which slots are configured to overlap apertures 83 and 84, respectively, whereby height adjustability is provided for linearly adjusting bracket 46 relative to tilting member 44.

Centrally located between side members 89 and 90 of adjusting bracket 46 is a substantially flat platform 96 which provides dual means for attaching a suitable retro-reflector assembly such as either of prism assemblies 48 and 50 shown, respectively, in FIGS. 4 and 5. As shown in FIG. 12, platform 96 includes an aperture 102 through the top thereof which may be threaded to provide means for receiving a threaded bolt extending from one apex of a triangularly configured prism assembly such as prism assembly 48 of FIG. 4 or extending from other singular or plural prism devices. In addition, platform 96 also includes ridges 98 and 100, shown in cross section in FIG. 13, and which are located along the lateral edges of platform 96. These ridges are designed to provide ledge-like support structure for receiving typical rectangular or lateral retro-reflector devices such as device 50 of FIG. 5. Lateral device 50 may be readily slid onto platform 96 and ridges 98 and 100 are adapted to receive corresponding curved flange portions of device 50 in slideable engagement as shown in FIG. 5.

It will now be seen that as a result of the unique plural structural combination of the present invention, a universally adjustable ranging target and retro-reflector housing bracket is provided and is adapted to receive any one of a plurality of different retro-reflector devices. Such devices may be adjusted in elevation and in distance H between the target center and the prism center to render the combination compatible with the corresponding distance H between the sighting telescope and ranging optics of any of a large plurality of electronic distance measuring instruments. Thus, unlike the prior art referred to previously, the present invention provides a target and housing bracket which is compatible with a plurality of prism assemblies and electronic distance measuring instruments and thus overcomes the substantial disadvantages of the prior art. In addition, it is to be noted that as a result of the manner in which triangles 68, 72, and 74 combine to provide a single target point relative to the distantly located observer or surveyor, adjustment of the distance H and/or the elevation angle of the tilting member 44 relative to the yoke member 42, does not change the location of the target center point as seen by the user through the sighting telescope. The target center point is in fact located precisely at a fixed point irrespective of any adjustments in elevation by tilting tilting member 44 and of any adjustments in the distance H by raising adjusting bracket 46 relative to tilting member 44. Accordingly, such adjustments induce no inaccuracy in the range measurement process.

It will now be understood that what has been disclosed herein is a combined sighting target and bracket adapted for receiving a reflector housing for use with electronic distance measuring instruments in surveying and other civil engineering applications. A unique three-member structure permits adjustment of vertical displacement between a reflector housing and the sighting target as well as adjustment of the elevation and azimuth angle of the reflecting device relative to the distantly located range measuring instrument. In addition, the present invention provides means for mounting any one of a plurality of different reflector configurations including those that utilize threaded bolts and those that utilize opposing flange members for slideable engagement with a bracket.

It will now be apparent to those having ordinary skill in the relevant art in which the present invention pertains, that although a preferred embodiment of the present invention has been disclosed herein, variations may be made to the specific dimensions, geometrical configurations, and materials that would be suitable for the invention. By way of example, although it has been found preferable to use a lightweight plastic material such as LEXAN for all of the various portions of the invention disclosed herein, numerous other materials such as aluminum or other lightweight metals or other plastics would also be suitable for the present invention. Therefore it will be understood that such variations and modifications are all considered to be within the scope of the invention which is to be limited only by the claims appended hereto.

We claim:

1. A combined sighting target and bracket for receiving a retro-reflecting device for use in conjunction with remotely located electronic distance measuring instruments using a target line-of-sight path and a range measurement path, the combination comprising:
   a yoke member having means for rotational engagement with a supporting tripod about an axis that is perpendicular to the surface upon which the tripod stands, said yoke member also having means for defining a first target line,
   a tilting member having means for rotational engagement with said yoke member about an axis that is parallel to the surface upon which the tripod stands, said tilting member also having means for defining a second target line that intersects said first target line at a point that is on said line-of-sight path, said point being stationary relative to such measurement instrument irrespective of the rotational position of said tilting member relative to said yoke member, and
   an adjusting bracket having means for slideably engaging said tilting member for linear adjustment relative thereto in a direction perpendicular to said second target line, and also having means for receiving a retro-reflecting device, said linear adjustment varying the distance between said retro-reflecting device and said point.

2. The combination recited in claim 1 wherein said adjusting bracket is adapted to receive any one of a plurality of retro-reflecting devices.

3. The combination recited in claim 1 wherein said adjusting bracket is adapted to position the optical center of a retro-reflecting device to lie on said range measurement path.

4. The combination recited in claim 1 wherein said tilting member is adapted to provide any angle of rotation relative to said yoke member for positioning said retro-reflecting device substantially normal to said range measurement path.

5. The combination recited in claim 2, wherein said plurality includes at least the following retro-reflecting devices:
   a single round retro-prism,
   a plural round retro-prism assembly,
   a single lateral retro-prism, and
   a plural lateral retro-prism assembly.

6. An apparatus for receiving a retro-reflecting device for use with a remotely located electronic distance measuring instrument, the apparatus comprising:
   azimuth rotation means adapted to receive a tripod for rotational support of said apparatus about a first axis substantially perpendicular to ground level,
   elevation rotation means rotatably connected to said azimuth rotation means for rotation of said retro-reflecting device about a second axis substantially parallel to ground level,
   said azimuth rotation means and said elevation rotation means defining a target point at about the intersection of said first and second axes, and
   linear adjustment means in slideable engagement with said elevation rotation means and adapted for receiving said retro-reflecting device for adjusting the distance between said retro-reflecting device and said target point.

7. The apparatus recited in claim 6 wherein said linear adjustment means is adapted to receive any one of a plurality of retro-reflecting devices.

8. The apparatus recited in claim 6 wherein said electronic distance measuring instrument utilizes a target line-of-sight path and a range measurement path and wherein said apparatus is adapted to position said target point on said target line-of-sight path and to position the optical center of said retro-reflecting device on said range measurement path.

9. The apparatus recited in claim 6 wherein said elevation rotation means is adapted to provide any angle of rotation relative to said azimuth rotation means for positioning said retro-reflecting device substantially normal to said range measurement path.

10. The apparatus recited in claim 7 wherein said plurality includes at least the following retro-reflecting devices:
   a single round retro-prism,
   a plural round retro-prism assembly,
   a single lateral retro-prism, and
   a plurality lateral retro-prism assembly.

* * * * *